(12) United States Patent
Ji et al.

(10) Patent No.: US 9,134,713 B2
(45) Date of Patent: Sep. 15, 2015

(54) SYSTEM AND METHOD FOR FAULT PROGNOSTICS ENHANCED MPC FRAMEWORK

(75) Inventors: Kun Ji, Plainsboro, NJ (US); Zhen Song, Plainsboro, NJ (US)

(73) Assignee: Siemens Corporation, Iselin, NJ (US)

( * ) Notice: Subject to any disclaimer, the term of this patent is extended or adjusted under 35 U.S.C. 154(b) by 702 days.

(21) Appl. No.: 13/469,137

(22) Filed: May 11, 2012

(65) Prior Publication Data

US 2013/0304235 A1  Nov. 14, 2013

(51) Int. Cl.
*G05B 13/04* (2006.01)
*G05B 23/02* (2006.01)

(52) U.S. Cl.
CPC .......... *G05B 13/048* (2013.01); *G05B 23/0297* (2013.01)

(58) Field of Classification Search
CPC .......................... G05B 13/048; G05B 23/0297
USPC ........... 700/28, 29, 30, 32, 33, 36, 37, 44, 45, 700/52; 702/182, 183, 185
See application file for complete search history.

(56) References Cited

U.S. PATENT DOCUMENTS

| | | | |
|---|---|---|---|
| 5,347,446 A * | 9/1994 | Iino et al. ........................ | 700/29 |
| 7,844,352 B2 * | 11/2010 | Vouzis et al. .................... | 700/44 |
| 8,200,346 B2 * | 6/2012 | Thiele ............................. | 700/44 |
| 8,295,951 B2 * | 10/2012 | Crisalle et al. ................. | 700/29 |
| 2005/0246039 A1 * | 11/2005 | Iino et al. ........................ | 700/29 |
| 2008/0097625 A1 * | 4/2008 | Vouzis et al. ................... | 700/29 |
| 2009/0198350 A1 * | 8/2009 | Thiele ............................. | 700/30 |
| 2010/0204808 A1 * | 8/2010 | Thiele ............................. | 700/30 |
| 2010/0268353 A1 * | 10/2010 | Crisalle et al. ................. | 700/29 |

FOREIGN PATENT DOCUMENTS

GB          2 360 855 A    10/2001

OTHER PUBLICATIONS

Peter J. Campo, et al. Norm Formulation of Model Predictive Control Problems. In American Control Conference, IEEE, Jun. 18, 1986 (pp. 339-343).
D.C. Psichogios, et al. "Nonlinear Internal Model Control and Model Predictive Control Using Neural Networks". In Intelligent Control, 1990. Proceedings., 5th IEEE International Symposium on Philadelphia, PA, Sep. 5, 1990 (pp. 1082-1087).
Pascal Dufour, et al. "Model Predictive Control of a Catalytic Reverse Flow Reactor". In IEEE Transactions on Control Systems, vol. 11, No. 5, Sep. 2003 (pp. 705-714).
S. Joe Qin, et al. "A Survey of Industrial Model Predictive Control Technology". In Control Engineering Practice, vol. 11, Jan. 1, 2003 (pp. 733-764).

* cited by examiner

*Primary Examiner* — Charles Kasenge (57) ABSTRACT

A model predictive control (MPC) framework is enhanced to provide prognostic information and fault tolerant control strategies. A system fault is calculated based on predicted values and is used to generate an internal reference trajectory to which the system is controlled using MPC. If the system fault exceeds a threshold maximum, then the MPC control model is either tuned or reconfigured depending on whether the fault is external or internal.

21 Claims, 6 Drawing Sheets

SYSTEM AND METHOD FOR FAULT PROGNOSTICS ENHANCED MPC FRAMEWORK

FIELD OF THE INVENTION

This invention relates generally to a model predictive control (MPC) framework for use, for example, in an industrial control system or a building automation system. More particularly, the invention relates to methods, systems and computer readable media that incorporate prognostic information and fault tolerant control strategies to deal with system faults caused by model mismatch, unmeasured disturbance and sensor noise.

BACKGROUND OF THE INVENTION

The control performance of a typical model-based control strategy is significantly mitigated by model uncertainty and other adverse conditions such as model mismatch, unmeasured disturbance, and sensor noise. For process control or building automation, this implies that significant material or energy is lost under those adverse conditions. Such conditions are not addressed adequately by current MPC technology.

Specifically, current MPC technology does not incorporate prognostic information of system faults into real-time controller operation. Instead, the controller's robustness against faults relies on offline controller design which usually could not cover all the possible adverse conditions that may occur during run-time operation. Current MPC technology therefore has poor fault-tolerant performance and has not been well adopted by some of the industry.

SUMMARY OF THE INVENTION

The present invention addresses the needs described above by providing a method for controlling a system having a process output y. A nominal system model is used to determine a predicted process output $\hat{y}(k)$ for a time k based on at least one previous manipulated value $u(k-1)$. A discrete process output $y(k)$ is received from time k. An internal reference trajectory $r_y(k) = r - \Delta y_F(k)$ is then computed, where r is a set point for the process output y, and $\Delta y_F(k)$ is a process fault equal to the discrete process output $y(k)$ minus the predicted process output $\hat{y}(k)$.

A nominal model predictive control framework is then used to manipulate a value u to cause the process output y to follow the internal reference trajectory $r_y(k)$ by minimizing a cost function J formulated to minimize system fault and optimize control system performance.

In another aspect of the invention, a nominal system model of a detection module is used to determine a predicted process output $\hat{y}(k)$ for a time k based on at least one previous manipulated value $u(k-1)$. A discrete process output $y(k)$ from time k is received.

A process fault $\Delta y_F(k)$ equal to the discrete process output $y(k)$ minus the predicted process output $\hat{y}(k)$ is then computed, and a determination is made that the process fault $\Delta y_F(k)$ is greater than a threshold maximum system fault $\Delta y_{Fmax}$. Based on that determination, diagnostics of a system model of a nominal model predictive control framework are enabled.

Those diagnostics include determining whether the process fault is internal or external. Only if the process fault is an external fault, existing controller parameters of the system model of the nominal model predictive control framework are tuned. Only if the process fault is an internal fault, the system model of the nominal model predictive control framework is reconfigured.

In another aspect of the invention, a non-transitory computer-usable medium is provided having computer readable instructions stored thereon for execution by a processor to perform methods for controlling a system as described above.

DESCRIPTION OF THE INVENTION

Current MPC technology cannot adequately handle system faults caused by model uncertainty and other adverse conditions, which are very common in the automation and control industry. The presently described prognostics-enhanced MPC technology (P-MPC) handles system faults adequately by incorporating on-line prognostic information and adaptively performs fault-tolerant control strategies.

Technological advancement has made detailed models of physical systems more affordable. For example, the latest IT technology has enabled the creation of complicated process models or building information models (BIM) that were not possible in the past. The current trend of advanced control research is focusing more and more on a model-based approach. MPC has been widely used as advanced control technology in the process industry for achieving optimal control. Model uncertainty and other unanticipated adverse conditions such as model mismatch, unmeasured disturbance, and sensor noise, however, are not addressed adequately by current MPC technology.

The presently described P-MPC adds additional fault detection, diagnosis, and handling (FDDH) functions into the traditional MPC framework. The proposed P-MPC framework incorporates prognostic information of the system and adaptively uses fault-tolerant control strategies to accommodate system faults caused by internal or external adverse conditions such as model mismatch, unmeasured disturbance, and sensor noise.

The presently described systems and methods achieve significant environmental and economic improvements by optimizing the control logic, which is typically implemented in software and can be easily upgraded.

Current MPC framework includes the following two phases at each step: (1) state and output estimation/prediction, and (2) optimization with constraint handling. Model uncertainty and other adverse conditions are not dealt with in those two phases, so the robustness of the control system fully relies on the offline controller design and simulation. Those offline elements do not address well the system faults caused by model mismatch and other adverse conditions that usually occur during run-time operation. One important aspect of the presently described P-MPC framework is the incorporation of system prognostic information to deal with the run-time system faults, which could not be handled by the current MPC framework.

The P-MPC framework includes the following three phases at each step:
1) State estimation and output prediction,
2) Fault detection, diagnosis, and handling (FDDH), and
3) Optimization with constraint handling.

The FDDH phase provides a closed-loop control system with fault handling functions to efficiently prevent potential catastrophic hardware failure. This makes the P-MPC a comprehensive fault-tolerant control framework.

Figure 1:
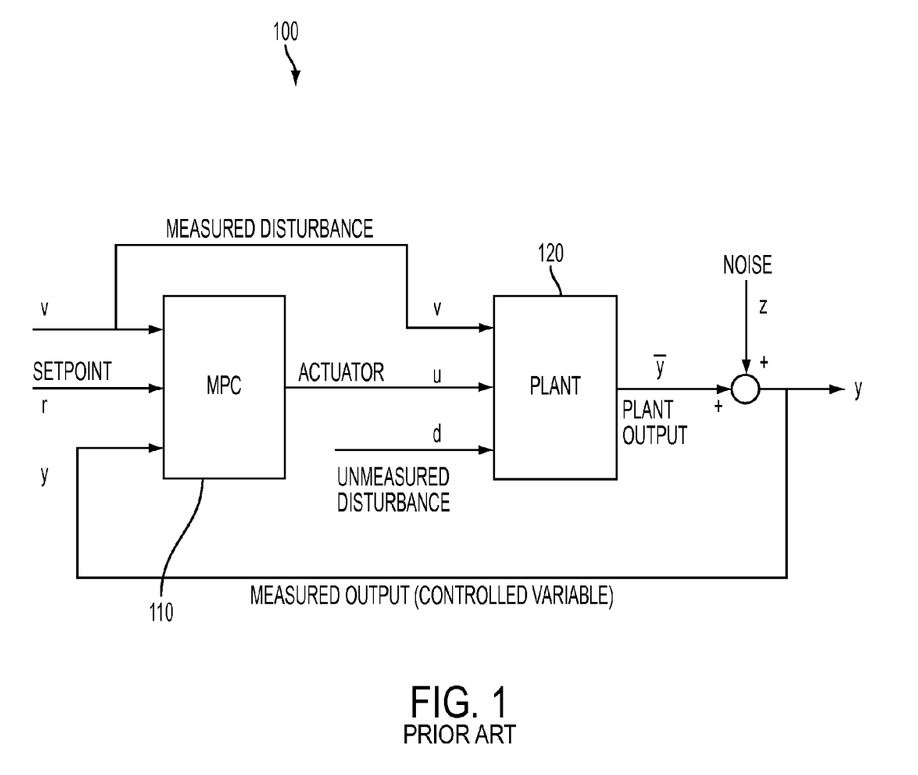
FIG. 1 is a schematic block diagram showing a prior art model predictive control framework.

A basic MPC framework 100 that is widely used in the process industry is shown in FIG. 1. The MPC controller 110 uses a nominal system model to do the estimation and prediction based on a set point r, a measured output y from the plant 120, and a measured disturbance v. The system does not take into account an unmeasured disturbance d in controlling the plant. An actuator signal u is manipulated by the MPC 110 to cause the output y of the plant 120 to follow the set point r. The control algorithms are designed offline and usually do not change during run-time. The nominal system model can only be changed offline when controller re-design is needed to achieve certain system control performance.

Figure 2:
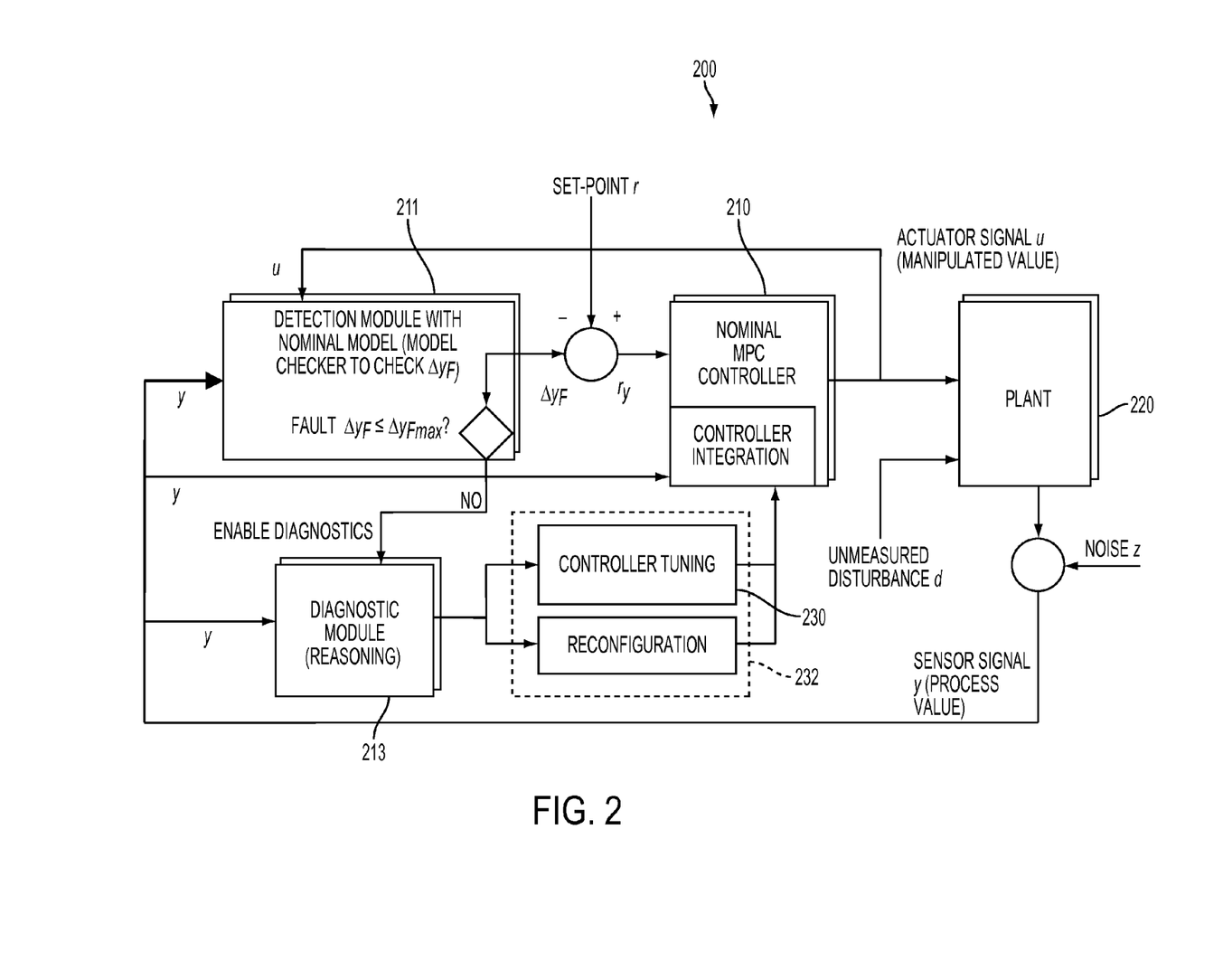
FIG. 2 is a schematic block diagram showing a prognostics-enhanced model predictive control framework in accordance with one embodiment of the invention.

An exemplary P-MPC framework 200 in accordance with the currently-described systems and methods is shown in FIG. 2. A detection module 211 and a diagnostic module 213, together with various new control strategies described in detail below, are added into the nominal MPC controller 210. The detection module 211 and diagnostic module 213 are responsible for run-time fault detection and diagnosis. New fault-tolerant control strategies are integrated into the nominal MPC controller 210 when detected system faults exceed a certain threshold. Those control strategies include controller tuning 230 and controller reconfiguration 232.

In one embodiment, wherein the system is modeled as a linear system, the following nominal system model is used:

$$x(k+1) = Ax(k) + Bu(k)$$

$$y(k) = Cx(k) + z(k).$$

In other embodiments, the nominal system model may be in a different form, such as a non-linear form. The P-MPC framework 200 described herein is independent of the system model.

The optimization problem of the nominal MPC framework 100 of FIG. 1 is the minimization of the following cost function:

$$J = \sum_{i=0}^{p-1} [(y(k+i+1|k) - r(k+i+1|k))^T Q(y(k+i+1|k) - r(k+i+1|k)) + \Delta u(k+i|k)^T R \Delta u(k+i|k)] + \rho_\varepsilon \varepsilon^2$$

where p is the prediction horizon, Q is the weighting matrix for predicted errors (Q>0), R is the weighting matrix for control moves (R≥0), and e is the slack variable (ε≥0) introduced to relax the constraints on the input and output of the system. The weight $\rho_\varepsilon$ on the slack variable ε penalizes the violation of the constraints.

The detection module 211 is constantly monitoring a system fault $\Delta y_F(k)$ which is defined as:

$$\Delta y_F(k) = y(k) - \hat{y}(k).$$

$\Delta y_F(k)$ is the difference between the measured process value y(k) and the estimated process value ŷ(k); i.e., the system fault due to model mismatch, unmeasured disturbance, and/or sensor noise or sensor malfunction. The estimated process value ŷ(k) is estimated based on the system nominal model and a previous control move u(k−1) as:

$$\hat{y}(k) = C\hat{x}(k)$$
$$= C[\hat{x}(k-1) + Bu(k-1)]$$
$$= \hat{y}(k-1) + CBu(k-1).$$

The threshold maximum system fault, $\Delta y_{Fmax}$, is used as the detection threshold for triggering diagnostics in the detection module 211. In one embodiment, the detection module detects a system fault if the following equation does not hold:

$$\Delta y_F \leq \Delta y_{Fmax}.$$

As shown in FIG. 2, if the system fault caused by model mismatch, unmeasured disturbance, or sensor noise is larger than the threshold maximum system fault, the diagnostic module 211 will enable diagnosis.

The above system fault detection equation can be extended to cope with a vector output, ensure low false alarm rate, and allow high detection rate. In one embodiment, a filter, such as a low pass filter, is adopted to eliminate wild points in the output data before the comparison. The following system fault detection equation applies a filter, which is denoted as f ( ). A scaling operator, such as the 2 norm, is used to convert an output vector to a scalar for comparison purposes. The scaling operator is denoted as ∥ ∥ in the equation:

$$\|f(\Delta y_F)\| \leq \|f(\Delta y_{Fmax})\|.$$

If it is found that the system fault $f(\Delta y_F)$ exceeds the threshold maximum system fault $f(\Delta y_{Fmax})$, the diagnostic module 213 performs diagnostic reasoning to distinguish whether the system fault is caused by an internal fault like model mismatch, or by an external fault such as unmeasured disturbance or sensor noise. Then, the diagnostic module 213 triggers corresponding adjusting measures of controller integration to improve the control system performance. The adjusting measures include:

1. Controller tuning: This strategy adjusts existing controller parameters (e.g., Q and R) to deal with an external fault.

2. Reconfiguration: This strategy adjusts/restructures the system model (nominal model) currently being used to deal with an internal fault; i.e., model mismatch. The detection module 211 and the diagnostic module 213 together with the adjusting measures of the controller 210 provide a closed-loop system fault control strategy.

As shown in the system 200 of FIG. 2, the nominal MPC controller 210 in the P-MPC framework does not optimize the system output y to follow the original set-point r, but instead optimizes y to follow an internal reference trajectory $r_y(k)$ where:

$$r_y(k) = r - \Delta y_F(k).$$

Then the cost function for the optimization problem of the P-MPC may be derived by substitution:

$$\min J = \min \sum_{i=0}^{p-1} \begin{bmatrix} (y(k+i+1|k) - r_y(k+i+1|k))^T \\ Q(y(k+i+1|k) - r_y(k+i+1|k)) + \\ \Delta u(k+i|k)^T R \Delta u(k+i|k) \end{bmatrix} + \rho_\varepsilon \varepsilon^2$$

$$= \min \sum_{i=0}^{p-1} \begin{bmatrix} (y(k+i+1|k) - r + \Delta y_F(k+i+1|k))^T \\ Q(y(k+i+1|k) - r + \Delta y_F(k+i+1|k)) + \\ \Delta u(k+i|k)^T R \Delta u(k+i|k) \end{bmatrix} + \rho_\varepsilon \varepsilon^2$$

$$= \min \sum_{i=0}^{p-1} \begin{bmatrix} (y(k+i+1|k) - r)^T Q(y(k+i+1|k) - r) + \\ \Delta y_F(k+i+1|k)^T Q \Delta y_F(k+i+1|k) + \\ \Delta u(k+i|k)^T R \Delta u(k+i|k) \end{bmatrix} + \rho_\varepsilon \varepsilon^2.$$

From the above, it is clear that the prognostic information of the system fault caused by model uncertainty and other adverse conditions is implicitly incorporated into the cost function J, which is formulated to minimize system fault and optimize control system performance.

Figure 3:
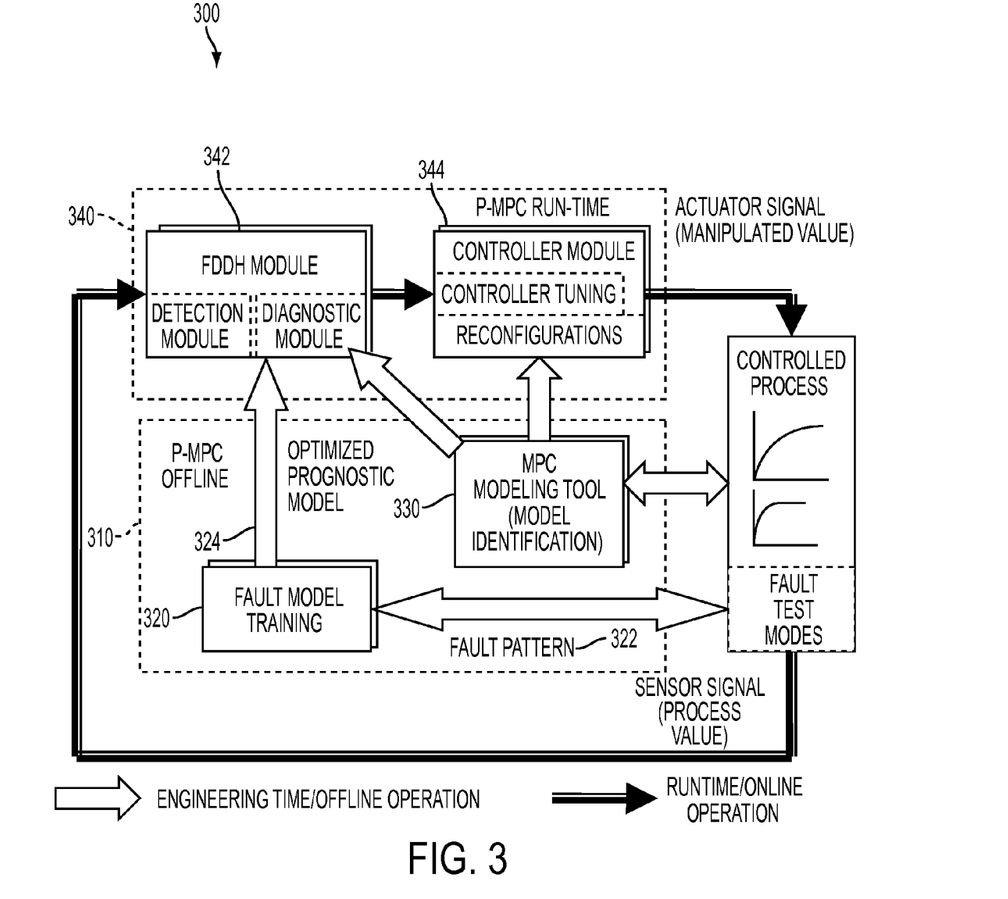
FIG. 3 is an architectural overview of a framework in accordance with one embodiment of the invention, including offline design/configuration and online run-time operation.

An architectural overview 300 of the P-MPC framework, including offline design/configuration 310 and online run-time operation 340, is shown in FIG. 3. The offline design/configuration 310 includes system fault model training 320 in addition to the nominal MPC model identification 330. The engineering steps are summarized as following, with reference to FIG. 3:

1. Using MPC model identification tool 330, application engineers create a process or plant nominal model, which will be used by the nominal controller 344 and the FDDH module 342.

2. Using the fault model training tool 320, users can establish identification fault patterns 322 by introducing model uncertainty with different fault test modes. The training tool 320 will generate an optimized prognostic model 324 which is used by the FDDH module 342 during run-time.

Figure 4A:
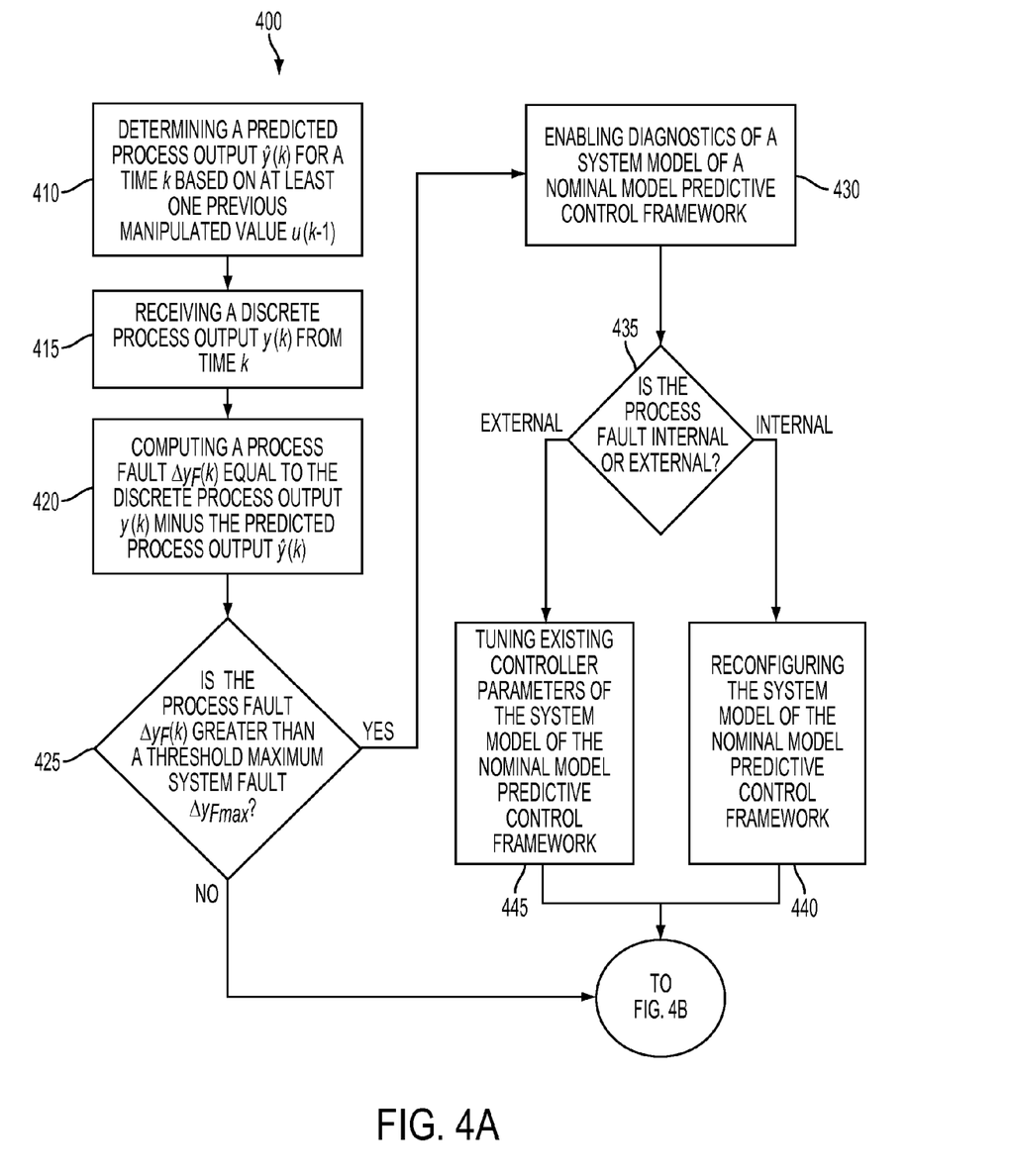
FIGS. 4A and 4B show a diagram of a process workflow in accordance with one embodiment of the invention.
Figure 4B:
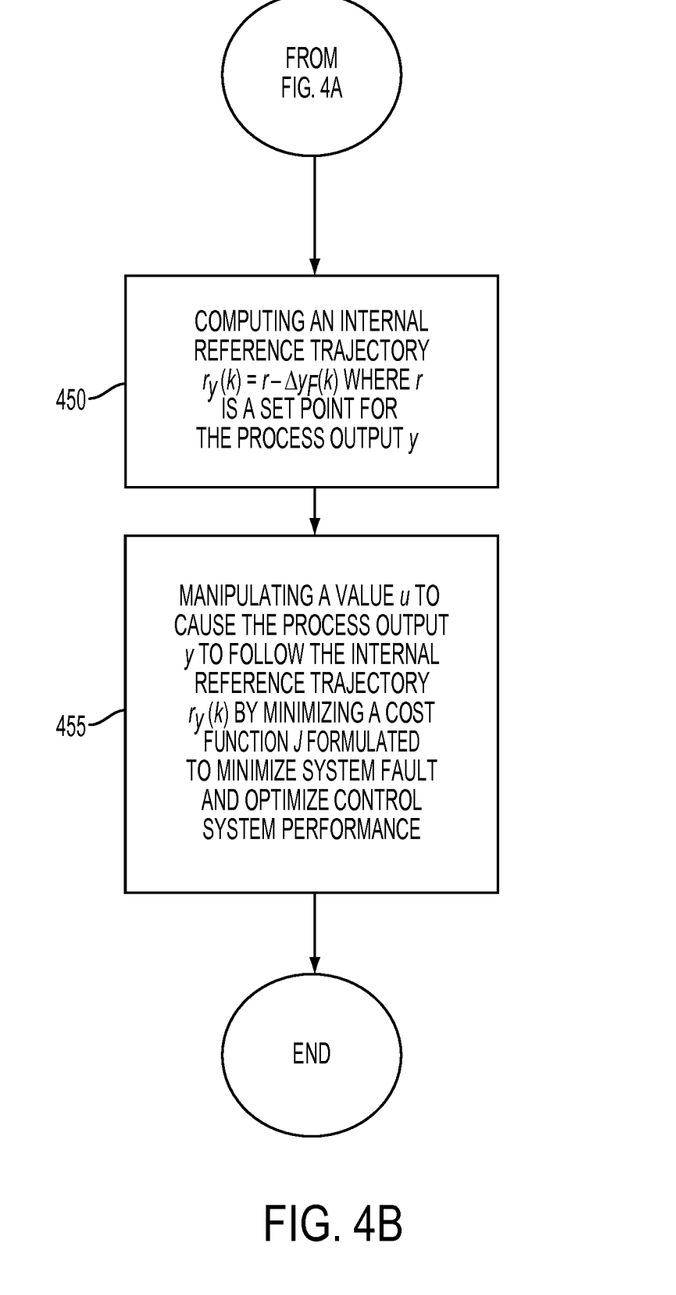

FIGS. 4A and 4B depict a flow chart illustrating a method 400 as described herein for controlling a system. The method includes using a nominal system model of a detection module to determine, at block 410, a predicted process output ŷ(k) for a time k based on at least one previous manipulated value u(k−1). At block 415, a discrete process output y(k) from time k is received. The discrete process output may, for example, be a sensor measurement, a plurality of sensor measurements, or a value calculated from one or more sensor measurements.

A process fault $\Delta y_F(k)$ equal to the discrete process output y(k) minus the predicted process output ŷ(k) is computed at block 420. At that point, a determination is made at decision block 425 whether the process fault $\Delta y_F(k)$ is greater than a threshold maximum system fault $\Delta y_{Fmax}$. If the process fault does not exceed the threshold, then the nominal system model used in the MPC control is not changed, and the system is controlled as shown in FIG. 4B.

If the process fault $\Delta y_F(k)$ is greater than the threshold maximum system fault $\Delta y_{Fmax}$, diagnostics of a system model of a nominal model predictive control framework is enabled at block 430. The diagnostics includes initially determining, at decision block 435, whether the process fault is internal or external. That determination is made based on the particular configuration of the controlled system, and is modeled using off-line fault model training 320 as discussed with reference to FIG. 3.

If it is determined that the process fault is an external fault, existing controller parameters of the system model of the nominal model predictive control framework are tuned at block 445. Tuning may include adjusting control parameters such as those contained in the weighting matrix Q for predicted errors, or in the weighting matrix R for control moves. In general, tuning the system model means changing parameters in the existing model, without adding or removing parameters or inputs.

If it is determined that the process fault is an internal fault, then the system model of the nominal model predictive control framework is reconfigured at block 440. Reconfiguring the system model includes adding or removing control parameters or inputs. Reconfiguring may be performed by an automated system or may be performed manually by an engineer after being alerted that an internal process fault has been detected.

Whether or not the system model diagnostics at blocks 430-445 is performed, the system model is used by the MPC framework to control the system using the novel technique shown in FIG. 4B. At block 450, an internal reference trajectory $r_y(k)=r−\Delta y_F(k)$ is computed, where r is a set point for the process output y.

A value u is then manipulated at block 455 to cause the process output y to follow the internal reference trajectory $r_y(k)$ by minimizing a cost function J formulated to minimize system fault and optimize control system performance. The manipulated value u may, for example, be one or more actuator control signals. Because the process output y is optimized to follow the internal reference trajectory $r_y(k)$, rather than the set point r, the prognostic information of the system fault $\Delta y_F(k)$ caused by model uncertainty is implicitly incorporated into the cost function J.

Figure 5:
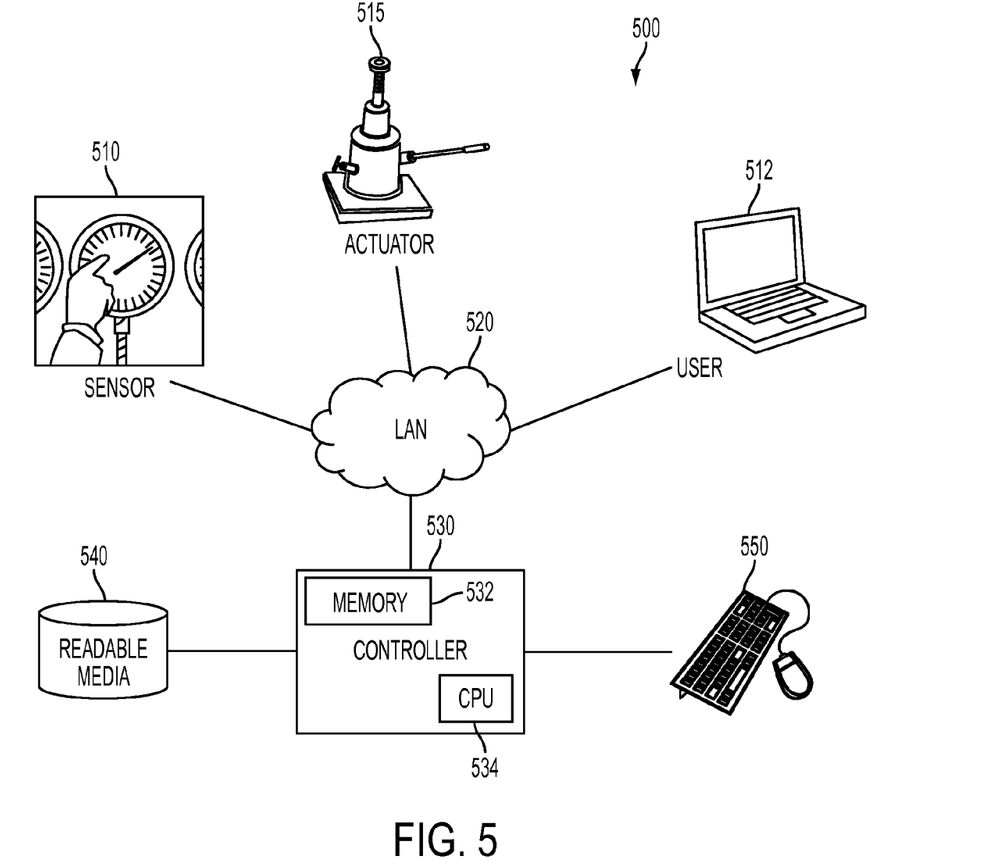
FIG. 5 is a representation of a system in accordance with one embodiment of the invention.

The elements of the methodology as described above may be implemented in a computer system comprising a single unit or a plurality of units linked by a network or a bus. An exemplary system 500 is shown in FIG. 5.

A controller 530 may be a dedicated industrial controller, a mainframe computer, a desktop or laptop computer or any other device capable of processing data. The controller 530 receives data from any number of data sources that may be connected to the computer, including a local area data network 520. Sensors such as sensor 510 and actuators such as actuator 515 are connected for communication with the controller 530 either directly, through the LAN 520 or through another network. A user 512 may also access the controller through the LAN 520.

The system controller 530 includes a central processing unit (CPU) 534 and a memory 532. The controller may be connected to an input and/or output device 550. The input may be a mouse, network interface, touch screen, etc., and the output may be a liquid crystal display (LCD), cathode ray tube (CRT) display, printer, etc. Alternatively, commands containing input/output data may be passed via the network 520. The controller 530 can be configured to operate and display information by using, e.g., the input and output devices 550 to execute certain tasks.

The CPU 534, when configured using software according to the present disclosure, includes modules that are configured to perform one or more methods for controlling a system as discussed herein.

The memory 532 may include a random access memory (RAM) and a read-only memory (ROM). The memory may also include removable media such as a disk drive, tape drive, memory card, etc., or a combination thereof. The RAM functions as a data memory that stores data used during execution of programs in the CPU 534; the RAM is also used as a work area. The ROM functions as a program memory for storing a program executed in the CPU 534. The program may reside on the ROM or on any other tangible or non-volatile computer-usable media, such as computer readable media 540, as computer readable instructions stored thereon for execution by the CPU or another processor to perform the methods of the invention. The ROM may also contain data for use by the program or other programs.

The above-described method may be implemented by program modules that are executed by a computer, as described above. Generally, program modules include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like. The disclosure may also be employed in distributed computing environments, where tasks are performed by remote processing devices that are linked through a communications network. In a distributed computing environment, modules may be located in both local and remote memory storage devices.

An exemplary processing module for implementing the methodology above may be hardwired or stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process steps described herein. The embodiments of the present disclosure are not limited to any specific combination of hardware and software and the computer program code required to implement the foregoing can be developed by a person of ordinary skill in the art.

The term "computer-readable medium" as employed herein refers to any tangible machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. Such media excludes propagated signals, which are not tangible. Cached information is considered to be stored on a computer-readable medium. Common expedients of computer-readable media are well-known in the art and need not be described in detail here.

The present invention is an innovative prognostic-enhanced model predictive control framework, which integrates a closed-loop control system and a fault handling strategy to overcome the disadvantages of current MPC technology. The proposed framework is capable of handling model uncertainty and other adverse conditions. It can be used as a foundation for developing next generation advanced fault-tolerant control methodology for industrial process control systems.

The foregoing detailed description is to be understood as being in every respect illustrative and exemplary, but not restrictive, and the scope of the disclosure herein is not to be determined from the description, but rather from the claims as interpreted according to the full breadth permitted by the patent laws. It is to be understood that various modifications will be implemented by those skilled in the art, without departing from the scope and spirit of the disclosure.

What is claimed is:

1. A method for controlling a system having a process output y, comprising:
   by a computer, using a nominal system model, determining a predicted process output $\hat{y}(k)$ for a time k based on at least one previous manipulated value u(k−1);
   receiving a discrete process output y(k) from time k;
   computing an internal reference trajectory $r_y(k)=r-\Delta y_F(k)$ where r is a set point for the process output y, and $\Delta y_F(k)$ is a process fault equal to the discrete process output y(k) minus the predicted process output $\hat{y}(k)$;
   by a computer, using a nominal model predictive control framework, manipulating a value u to cause the process output y to follow the internal reference trajectory $r_y(k)$ by minimizing a cost function J formulated to minimize system fault and optimize control system performance;
   wherein the system is a linear system and the cost function J is defined as:

$$\Sigma_{i=0}^{p-1}[(y(k+i+1|k)-r)^T Q(y(k+i+1|k)-r)+\Delta y F k+i+1 k T Q \Delta y F k+i+1 k+\Delta u k+i k T R \Delta u k+i k+\rho_\epsilon \epsilon 2,$$

where p is a prediction horizon, Q is a weighting matrix for predicted errors, $\Delta u$ is a control move of the manipulated value u, R is a weighting matrix for the control move $\Delta u$, $\epsilon$ is a slack variable and $\rho_\epsilon$ is a weight penalizing violations of constraints.

2. A method as in claim 1, further comprising:
   transmitting an alarm based on a determination that $\Delta y_F(k) > \Delta y_{Fmax}$ where $\Delta y_{Fmax}$ is a threshold maximum system fault.

3. A method as in claim 1, wherein the nominal model predictive control framework uses the nominal system model.

4. A method for controlling a system, comprising:
   by a computer, using nominal system model of a detection module, determining a predicted process output $\hat{y}(k)$ for a time k based on at least one previous manipulated value u (k−1);
   receiving a discrete process output y(k) from time k;
   computing a process fault $\Delta y_F(k)$ equal to the discrete process output y(k) minus the predicted process output $\hat{y}(k)$;
   determining that the process fault $\Delta y_F(k)$ is greater than a threshold maximum system fault $\Delta y_{Fmax}$;
   by a computer, only if the process fault $\Delta y_F(k)$ is greater than the threshold maximum system fault $\Delta y_{Fmax}$, enabling diagnostics of a system model of a nominal model predictive control framework, including:
      determining whether the process fault is internal or external;
      only if the process fault is an external fault, tuning existing controller parameters of the system model of the nominal model predictive control framework; and
      only if the process fault is an internal fault, reconfiguring the system model of the nominal model predictive control framework.

5. A method as in claim 4, wherein the nominal system model of the detection module is the same system model as the system model of the nominal model predictive control framework.

6. A method as in claim 4, wherein the process fault is determined to be an internal fault when the process fault is determined to be due to a logical mismatch between the system model of the nominal model predictive control framework and the system.

7. A method as in claim 4, wherein the process fault is determined to be an external fault when the process fault is determined to be due to at least one of an unmeasured disturbance, sensor noise and a sensor malfunction.

8. A method as in claim 4, wherein the process fault $\Delta y_F(k)$ and the threshold maximum system fault $\Delta y_{Fmax}$ are vectors and the method further comprises:
applying a filter to the process fault $\Delta y_F(k)$ and the threshold maximum system fault $\Delta y_{Fmax}$ to produce filtered vectors; and
converting the filtered vectors to scalars before determining that the process fault $\Delta y_F(k)$ is greater than a threshold maximum system fault $\Delta y_{Fmax}$.

9. A method as in claim 4, further comprising:
transmitting an alarm based on the determining that the process fault $\Delta y_F(k)$ is greater than the threshold maximum system fault $\Delta y_{Fmax}$.

10. A method as in claim 4, further comprising:
computing an internal reference trajectory $r_y(k)=r-\Delta y_F(k)$ where r is a set point for the process output y;
using the nominal model predictive control framework, manipulating a value u to cause the process output y to follow the internal reference trajectory $r_y(k)$ by minimizing a cost function J formulated to minimize system fault and optimize control system performance.

11. A method as in claim 10, wherein the system is a linear system and the cost function J is defined as:

$$\Sigma_{i=0}^{p-1}[(y(k+i+1|k)-r)^T Q(y(k+i+1|k)-r)+\Delta y F k+i+1 k T Q \Delta y F k+i+1 k+\Delta u k+i k T R \Delta u k+i k+\rho_\epsilon \epsilon 2,$$

where p is a prediction horizon, Q is a weighting matrix for predicted errors, $\Delta u$ is a control move of the manipulated value u, R is a weighting matrix for the control move $\Delta u$, $\epsilon$ is a slack variable and $\rho_\epsilon$ is a weight penalizing violations of constraints.

12. A method as in claim 11, wherein the existing controller parameters of the system model of the nominal model predictive control framework include at least one of the weighting matrix Q for predicted errors and the weighting matrix R for the control move $\Delta u$.

13. A non-transitory computer-usable medium having computer readable instructions stored thereon for execution by a processor to perform a method for controlling a system, the method comprising:
using nominal system model of a detection module, determining a predicted process output $\hat{y}(k)$ for a time k based on at least one previous manipulated value u (k−1);
receiving a discrete process output y(k) from time k;
computing a process fault $\Delta y_F(k)$ equal to the discrete process output y(k) minus the predicted process output $\hat{y}(k)$;
determining that the process fault $\Delta y_F(k)$ is greater than a threshold maximum system fault $\Delta y_{Fmax}$;
only if the process fault $\Delta y_F(k)$ is greater than the threshold maximum system fault $\Delta y_{Fmax}$, enabling diagnostics of a system model of a nominal model predictive control framework, including:
determining whether the process fault is internal or external;
only if the process fault is an external fault, tuning existing controller parameters of the system model of the nominal model predictive control framework; and
only if the process fault is an internal fault, reconfiguring the system model of the nominal model predictive control framework.

14. A non-transitory computer-usable medium as in claim 13, wherein the nominal system model of the detection module is the same system model as the system model of the nominal model predictive control framework.

15. A non-transitory computer-usable medium as in claim 13, wherein the process fault is determined to be an internal fault when the process fault is determined to be due to a logical mismatch between the system model of the nominal model predictive control framework and the system.

16. A non-transitory computer-usable medium as in claim 13, wherein the process fault is determined to be an external fault when the process fault is determined to be due to at least one of an unmeasured disturbance, sensor noise and a sensor malfunction.

17. A non-transitory computer-usable medium as in claim 13, wherein the process fault $\Delta y_F(k)$ and the threshold maximum system fault $\Delta y_{Fmax}$ are vectors and the method further comprises:
applying a filter to the process fault $\Delta y_F(k)$ and the threshold maximum system fault $\Delta y_{Fmax}$ to produce filtered vectors; and
converting the filtered vectors to scalars before determining that the process fault $\Delta y_F(k)$ is greater than a threshold maximum system fault $\Delta y_{Fmax}$.

18. A non-transitory computer-usable medium as in claim 13, the method further comprising:
transmitting an alarm based on the determining that the process fault $\Delta y_F(k)$ is greater than the threshold maximum system fault $\Delta y_{Fmax}$.

19. A non-transitory computer-usable medium as in claim 13, the method further comprising:
computing an internal reference trajectory $r_y(k)=r-\Delta y_F(k)$ where r is a set point for the process output y;
using the nominal model predictive control framework, manipulating a value u to cause the process output y to follow the internal reference trajectory $r_y(k)$ by minimizing a cost function J formulated to minimize system fault and optimize control system performance.

20. A non-transitory computer-usable medium as in claim 19, wherein the system is a linear system and the cost function J is defined as:

$$\Sigma_{i=0}^{p-1}[(y(k+i+1|k)-r)^T Q(y(k+i+1|k)-r)+\Delta y F k+i+1 k T Q \Delta y F k+i+1 k+\Delta u k+i k T R \Delta u k+i k+\rho_\epsilon \epsilon 2,$$

where p is a prediction horizon, Q is a weighting matrix for predicted errors, $\Delta u$ is a control move of the manipulated value u, R is a weighting matrix for the control move $\Delta u$, $\epsilon$ is a slack variable and $\rho_\epsilon$ is a weight penalizing violations of constraints.

21. A non-transitory computer-usable medium as in claim 20, wherein the existing controller parameters of the system model of the nominal model predictive control framework include at least one of the weighting matrix Q for predicted errors and the weighting matrix R for the control move $\Delta u$.

* * * * *